Oct. 28, 1930.   J. D. COWAN   1,779,802
COMPRESSION RAIL JOINT SPRING
Filed Nov. 29, 1929   2 Sheets-Sheet 2
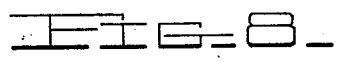
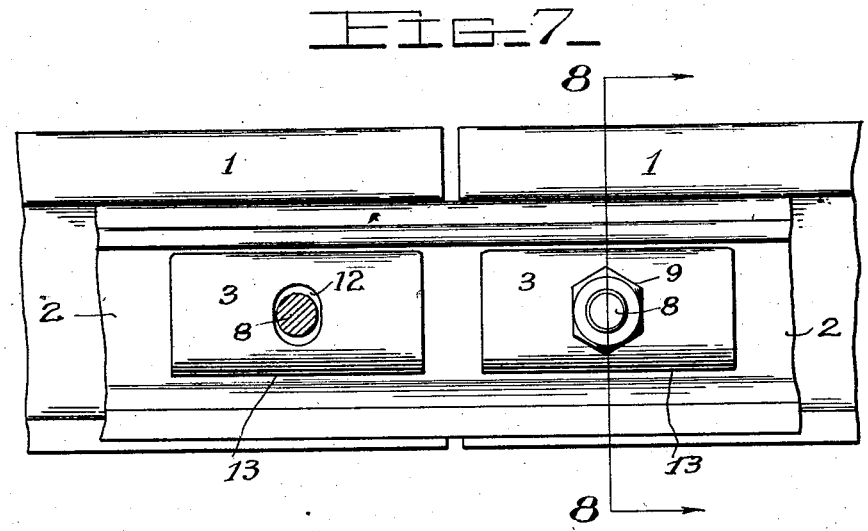
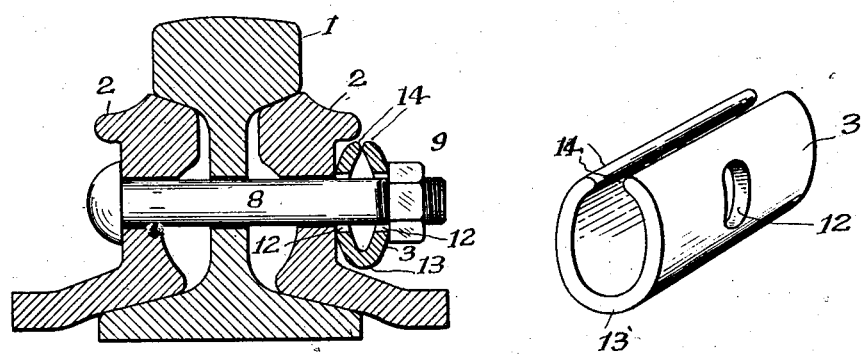
Inventor
James D. Cowan
by
Attorney Patented Oct. 28, 1930

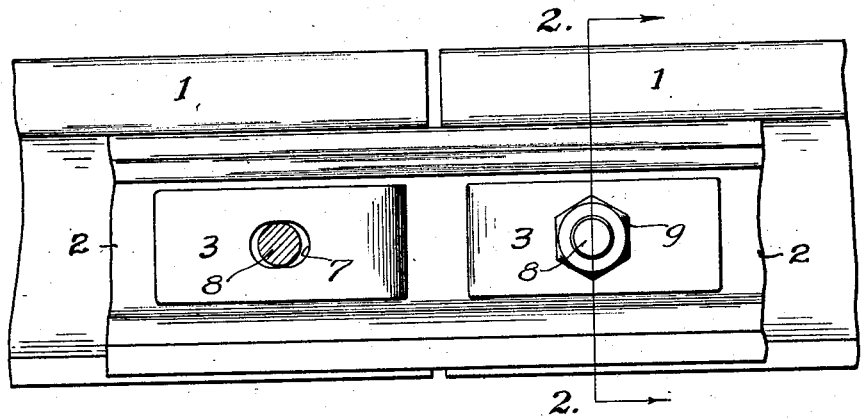
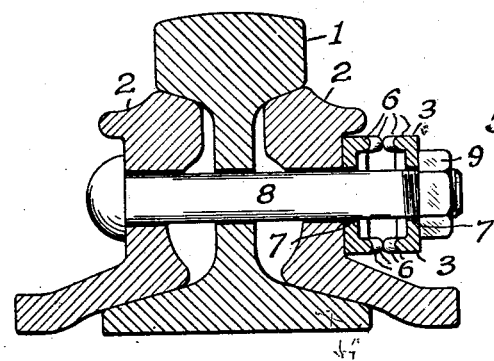
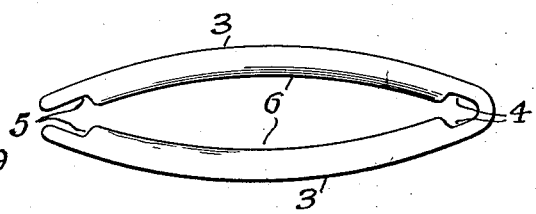
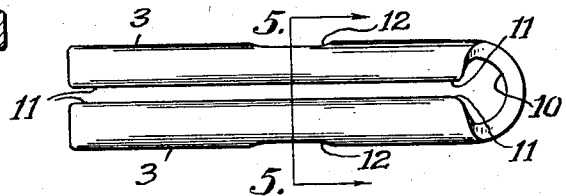
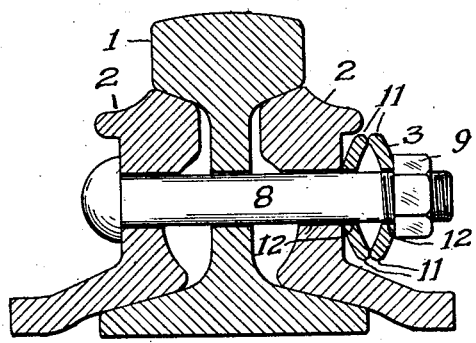
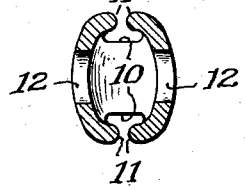

1,779,802

UNITED STATES PATENT OFFICE

JAMES D. COWAN, OF SUMMIT, NEW JERSEY, ASSIGNOR TO THE NATIONAL LOCK WASHER COMPANY, OF NEWARK, NEW JERSEY, A CORPORATION OF NEW JERSEY

COMPRESSION RAIL-JOINT SPRING

Application filed November 29, 1929. Serial No. 410,406.

This invention relates to compression rail joint springs that are placed beneath the nuts driven on bolts that pass through the splice bars and the webs of meeting railroad rails, so as to hold them to gauge, particularly during the passage of heavy loads.

Devices known as compression spring washers that are in the form of helical segments are usually employed for this purpose, but their range of reaction is limited, and the object of the present invention is to provide a structure by which an increase in the range of reaction can be obtained, both at the lower and the higher pressures put on the rail joint bolts, it being understood that, whether such reaction is under a high or a low pressure, requirements will be observed similar to those attaching to the ordinary spring washer, as to load, unit stress, design of splice bar, spacing of bolts, diameter and length of bolts, and the material from which the springs are made, &c.

Another object of the invention is to provide a simple economical means for keeping the rail joints tight and under uniform tension by compensating for wear of bolted parts and possibly the lengthening of bolts due to stretch or expansion.

A further object of the invention is to prevent the nut from backing off by maintaining high pressure against the under side of the nut.

A still further object is to permit of the ready equalizing and adjustment of pressures exerted upon the joint by each of the bolts thereof, this being due to the fact that the construction of spring employed is capable of exerting high reactive pressures upon the rail joints throughout a range equal to or greater than any probable variations in lengths of bolts or bolted parts due to stretch, expansion, shrinkage or wear and tear.

Increasing the reaction of a spring when freed from a load naturally results in increasing the deflection of such spring under a load, and vice versa. The deflection and reaction of the usual form of compression spring washers may be increased for a given load and a given modulus of elasticity or a given torsional modulus, without increasing the unit stress on the metal, by increasing the length or decreasing the moment of inertia in the case of a spring washer of elliptical shape, and by increasing the number of convolutions and decreasing the polar moment of inertia in the case of washers that are made in the form of helical segments, in a ratio such as is indicated by the expressions for determining the deflection of beams and helical springs when loads are applied.

Increasing the number of convolutions in a helical spring washer necessitates an increase in the length of the bolt to the extent that the bolt length would be objectionable.

Decreasing the polar moment of inertia in a helical spring washer may, of course, be accomplished by changing the width and thickness, in the event the cross section is rectangular which is generally the cross section used, or it may be decreased by changing the shape of the cross section; but whether the polar moment is reduced by changing the dimensions or the shape, there are certain limitations in this respect: for instance, the design of the splice plate against which the spring washer is to be placed limits the width of the section, and therefore, increasing the reaction for a given load range could not be brought about if the width of the section used was at the maximum permitted by the splice plate, and this is generally found to be the case, unless the shape is changed, but even this does not offer much in a practical sense with regard to decreasing the polar moment of inertia as the sections are not large enough to permit very much of a reduction.

By studying the compression washer design, it will be seen that, while its length is limited to the bolt spacing and its width is limited to the design of the splice plate of the rail joint it has less limitations than the helical spring washer when it is desired to get an increase in the range of reaction for a given load.

Referring to the accompanying drawings which illustrate preferred embodiments of the invention Figure 1 is an elevation illustrating one form of the invention applied to a splice bar, one of the bolts being sectioned—

Figure 2 is a section at the line 2—2 of Figure 1—

Figure 3 is a detailed side elevation of the form of the invention illustrated at Figures 1 and 2—

Figure 4 is a view similar to Figure 3 but showing a different form of the invention—

Figure 5 is a section at the line 5—5 of Figure 4—

Figure 6 is a view like Figure 2 but showing the rail joint spring illustrated at Figures 4 and 5, the spring being under compression—

Figure 7 is a view like Figure 1, but showing a modified form of the invention—

Figure 8 is a section at the line 8—8 of Figure 7, and

Figure 9 is a detail perspective view of the spring shown at Figures 7 and 8.

Similar numerals of reference denote like parts in the several figures of the drawing.

Referring to Figures 1, 2 and 3, 1 represents the railroad rails, and 2 the splice bars applied thereto in the usual manner.

3 represents the compression rail joint spring which is made from channel stock and is bent into shape so that the bent portions are opposed to each other and form a structure that is elliptical lengthwise. The manufacture of this structure from channel stock renders it necessary to cut away the stock at the point of bending and also at the forward ends as shown respectively at 4, 5, and the side edges of the two sections of the structure have inwardly extending lip portions 6, which constitute quite an important feature of the invention.

The sections of the structure are provided with holes 7 at their middle portions, for the accommodation of the bolts 8 and these holes are somewhat elongated in order to make allowance for the movements of the elliptical structure under compression and reaction.

This construction shown at Figure 3 is applied in the manner shown at Figure 2, and there are, of course, two of such constructions, one at each end of the splice bar, and as they are precisely alike, a description as to one will suffice.

Referring to Figure 2 the structure is shown under compression which will cause the lips 6 to contact at both ends of the structure, and as the compression increases, it will be clear that these lips will greatly add to the stiffness and the consequent resistance of the structure to compression, and as the compression approaches a maximum the sections will tend to flatten out and the extreme ends of the structure will be spaced further apart.

This compression rail joint spring is initially compressed to a suitable degree by means of a track wrench that is applied to a nut 9 driven on the threaded end of the bolt 8 against the spring. During the passage of heavy loads over the rails the sections of the spring will be compressed, but their recovery after a load has passed will be greatly enhanced by the presence of the lips 6, and at the same time there will always be a great pressure exerted against the nut which will prevent any backing of the latter off the bolt.

Referring to Figures 4, 5 and 6, the construction therein shown is concavo-convex in cross section and is cut away at the point of bending as shown at 10, and the sections of the spring formed after bending and shaping will present an elliptical shape in cross section as shown at Figure 5, with the side edges of the sections forming lips 11 that extend inwardly toward each other and are normally spaced apart.

This construction shown at Figures 4 and 5 also has holes 12 formed in its sections for the admission of the bolts, and when this construction is applied in the manner shown at Figure 6 and is placed under compression, these lips 11 will have a rolling contact with each other and the sections will tend to flatten out under the stress caused by the passing of heavy loads on the rails, but when this stress is relaxed the recovery of this particular form of the invention will be greatly assisted by the stiffness of the sections that is caused by the presence of the inwardly extending lips 11.

Referring to Figures 7, 8, and 9, the construction shown is similar to that shown at Figures 4, 5 and 6, except that the blank from which the spring is formed is bent lengthwise instead of crosswise, the lips along one edge merging into the bend 13, while along the other edge are lips 14 that extend toward each other.

It will thus be noted that the action of the three forms of this invention illustrated at Figures 3, 4 and 9 is quite similar and that in all instances the inwardly extending lips constitute a feature of the invention, and therefore it is immaterial whether the structure is elliptical lengthwise or crosswise.

If the crosswise elliptical construction is used, the fold can be at one end as shown by Figures 4, 5 and 6, or it can be lengthwise as shown in Figures 7, 8, and 9, and in this latter construction the fold takes the place of the inwardly extending lips along one side. In this way it is possible to have a greater amount of metal along the axis through the bolt hole where the maximum bending moment occurs under compression than is possible in a device which is elliptical lengthwise. It can, therefore, be subjected to a greater bending stress without the probability of breaking than can the device which is elliptical lengthwise.

All of the constructions above described are formed by bending an elongated and substantially rectangular metal blank crosswise or lengthwise at its middle, and therefore the compressible members of all structures are opposite each other and are connected at one end or side by an integral bend.

What is claimed is:—

1. A compression rail joint spring consisting of opposed members of substantially equal length and width and connected by an integral bend, said members in one dimension presenting complementary parts of an elliptical formation, and the free edges of said formation being extended toward each other.

2. A compression rail joint spring, consisting of opposed members of substantially equal length and width and connected at one end of one dimension by an integral bend, the free side edges of said members being rounded and extended toward each other, and the members themselves in one dimension presenting complementary parts of an elliptical formation.

3. A compression rail joint spring of elliptical form and comprising opposite members joined at one end by an integral bend, the free side edges of said members being rounded and extended toward each other.

In testimony whereof I affix my signature hereto.

JAMES D. COWAN.